UNITED STATES PATENT OFFICE 2,484,296

N-SUBSTITUTED OXYACETAMIDES

Lowell B. Kilgore, Washington, D. C., assignor, by mesne assignments, to Lowell B. Kilgore and Helen Ford Kilgore, both of Washington, D. C.

No Drawing. Application April 27, 1945, Serial No. 590,723

15 Claims. (Cl. 167—30)

The invention described herein relates to new organic compounds, more particularly to a new class of N-substituted acetamides and specifically to N-substituted α-etherified acetamides and methods for their preparation. This application is a continuation-in-part of my co-pending application Serial No. 461,481, now Patent No. 2,426,885 filed October 9, 1942.

An object of the present invention is to provide new and useful compounds of the general formula:

R—O—CH2CO—NHR' wherein R is a cyclic organic radical selected from the group consisting of halogenated aryl, homocyclic-substituted aryl, aryl of the naphthalene series and cycloalkyl; and R' is a radical selected from the group consisting of alkyl containing at least 4 carbon atoms, alkenyl, and cycloalkyl. A further object of this invention is the preparation of new and useful chemicals which possess insect combating properties to a high degree. Other objects and advantages of the invention will hereinafter appear.

These objects may be accomplished by reacting an α-etherified acetic acid with a primary amine so as to eliminate a molecule of water as follows:

(1) R—O—CH2COOH+R'NH2→
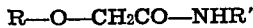
R—O—CH2CONHR'+HOH

The same objects may also be accomplished by reacting an amide-forming derivative of an α-etherified acetic acid, such as the acyl halide, acid anhydride, or the ester of a volatile alcohol with a primary amine. These methods of preparing my new N-substituted α-etherified acetamides are characterized by the following equations:

(2) R—O—CH2COOY+R'NH2→
R—O—CH2CO—NHR'+YOH
(3) R—O—CH2COX+R'NH2→
R—O—CH2CO—NHR'+HX wherein Y is the hydrocarbon residue of a volatile alcohol and X is halogen.

Still another means which I have discovered of attaining the objects of this invention comprises reacting the proper N-substituted α-haloacetamide with the alkali oxide of the requisite alcohol as shown by the following equation:

(4) R—O—Me+XCH2CO—NHR'→
R—O—CH2CO—NHR'+MeX wherein Me represents an alkali metal and X is halogen. In the foregoing equations (1), (2), (3) and (4), and R and R' represent either the same or different organic radicals.

The various means of obtaining the objects of this invention will be more readily understood by the following showing of detailed examples which, however, do not limit the scope of the invention in any way.

EXAMPLE 1

*Preparation of N-cyclohexyl 2, 4, 5, 6-tetrachlorophenoxyacetamide*

Twenty-five parts of sodium 2, 4, 5, 6-tetrachlorophenate were treated with 18 parts of N-cyclohexyl α-chloroacetamide dissolved in dry benzene and warmed to cause the reaction to take place. The reaction mixture was extracted with benzene-ether solution, washed until neutral and fractionated. The residue solidified and was recrystallized from benzene to produce white needles melting at 105–106° C. and identified as N-cyclohexyl 2, 4, 5, 6-tetrachlorophenoxyacetamide.

EXAMPLE 2

*Preparation of N-amyl o-chlorophenoxyacetamide*

5 grams of methyl o-chlorophenoxyacetate were covered with 5 grams of amyl amine and the mixture heated on an oil bath for 5 hours. The reaction mixture was diluted with benzene, washed with dilute HCl and then water, and fractionated under reduced pressure. The product, N-amyl o-chlorophenoxyacetamide, boiled at 175° C./5 mm.

EXAMPLE 3

*Preparation of N-isoamyl cyclohexoxyacetamide*

A mixture of 13 grams of cyclohexoxyacetic acid and 10 grams of isoamylamine were refluxed together for 8 hours. The resulting reaction mixture was distilled under reduced pressure. 10 grams of N-isoamyl cyclohexoxyacetamide boiling at 129–32° C./1 mm. were obtained.

Other members of the new series of N-substituted α-etherified acetamides which I have prepared by the methods set out in the aforedescribed examples are:

N-amyl p-chlorophenoxyacetamide
N-heptyl p-chlorophenoxyacetamide
N-butyl 2,4,5-trichlorophenoxyacetamide
N-amyl 2,4,5-trichlorophenoxyacetamide
N-heptyl 2,4,5-trichlorophenoxyacetamide
N-cyclohexyl 2,4,5-trichlorophenoxyacetamide
N-allyl 2,4,5,6-tetrachlorophenoxyacetamide
N-amyl 2,4,5,6-tetrachlorophenoxyacetamide
N-allyl 2,3,4,5,6-pentachlorophenoxyacetamide N-cyclohexyl cyclohexoxyacetamide
N-cyclohexyl α-naphthoxyacetamide
N-butyl α-naphthoxyacetamide
N-heptyl α-naphthoxyacetamide
N-hexadecyl α-naphthoxyacetamide
N-octadecyl α-naphthoxyacetamide
N-isobutyl o-phenyl-phenoxyacetamide
N-cyclohexyl o-cyclohexyl-phenoxyacetamide Moreover I have discovered that these new N-substituted α-etherified acetamides possess contact insecticidal properties. This was shown by the Peet-Grady bio-assay technique using house flies. The test solutions were made up in a deodorized kerosene base. Table II illustrates the efficacy of representative members of this new series of compounds.

Table II

| Compound | Concentration, Per Cent by Weight | Per cent Knock down in 10 minutes | Kill after 24 hours |
| --- | --- | --- | --- |
| N-Amyl 2,4,5-trichlorophenoxyacetamide | 5 | 92 | 55 |
| N-Heptyl 2,4,5-trichlorophenoxyacetamide | 5 | 61 | 36 |
| N-Amyl 2,4,5,6-tetrachlorophenoxyacetamide | 5 | 96 | 56 |
| N-Cyclohexyl cyclohexoxyacetamide | 5 | 99 | 81 |

I have discovered that the new N-substituted α-etherified acetamides of my invention, as a class, possess valuable insect toxicant and fugient properties. Furthermore the physical properties of these compounds such as odor and color are such as to make them unobjectionable for human use.

Table I demonstrates the efficacy of representative members of this new series of organic compounds against the common housefly, *Musca domestica*. The test procedure used was the "Sandwich bait" method substantially described in Soap, June 1939, p. 103 ff. A coating of molasses was applied to one side of a strip of blotting paper and dried to a hard glossy surface. The molasses was then covered with a strip of a special thin, porous paper which had previously been immersed in an alcohol solution of the compound to be tested and then dried until the alcohol had evaporated. For purpose of comparison one strip was treated only with solvent and dried. The strips prepared in this fashion were mounted on a board and introduced into a large cage containing more than 2000 hungry house flies. By making readings at intervals, the duration of repellency, that is the length of time which elapsed before the flies began to feed on the molasses through the treated tissue was determined.

Table I

| Compound | Concentration, Percent by Weight | Duration of Repellency |
| --- | --- | --- |
| N-Amyl p-chlorophenoxyacetamide | 30 | 2 hr. |
| N-Amyl 2,4,5,6-tetrachlorophenoxyacetamide | 10 | 8 hr. 20 min.[1] |
| N-Allyl 2,4,5,6-tetrachlorophenoxyacetamide | 5 | 6 hr. 10 min.[1] |
| N-Cyclohexyl 2,4,5,6-tetrachlorophenoxyacetamide | 10 | 2 hr. 35 min. |
| N-Allyl 2,3,4,5,6-pentachlorophenoxyacetamide | 5 | 3 hr. |
| N-Cyclohexyl cyclohexoxyacetamide | 5 | 8 hr. |
| N-Isoamyl cyclohexoxyacetamide | 5 | 1 hr. |

[1] Bait still untouched. Test discontinued to feed flies.

Not only do the compounds of my invention possess especially marked repellency to house flies, they are also very effective against other annoying pests such as the blackfly, mosquito, flea, red bug, gnat and moth.

EXAMPLE 4

When applied to the forearm of an individual exposed to hungry *Aedes aegypti* mosquitoes, N-cyclohexyl cyclohexoxyacetamide repelled the insects for two hours at which time the test was discontinued. The biting density on an unprotected arm was 30 to 40 bites per minute.

These new N-substituted α-etherified acetamides may be employed by direct topical application or they may be incorporated into liquid or solid carriers. They are especially useful as the active ingredients of insect-repellent lotions, creams, ointments and the like. They may be dissolved in liquid diluents such as alcohol, aqueous alcohol, ispropanol, dimethyl phthalate and hydrocarbon oils such as kerosene or emulsified in water, if necessary with the aid of a suitable dispersing agent. If desired they may be admixed with finely divided carriers such as diatomaceous earth, talc, pyrophylite, bentonite, etc.

Furthermore the new compounds of my invention may be combined with insecticidal materials such as pyrethrum, rotenone, derris, cube, DDT and the like. Such a combination is particularly effective where the paralytic and lethal action of the insecticide is slow.

Although this invention has been described with reference to illustrative embodiments thereof it will be apparent to those skilled in the art that the principles of this invention may be embodied in other forms but within the scope of the appended claims.

What I claim is:

1. The N-substituted α-etherified acetamides having the general formula:

R—O—CH₂CO—NHR' wherein R is a cyclic organic radical selected from the group consisting of halogenated aryl, homocyclic-substituted aryl, aryl of the naphthalene series and unsubstituted cycloalkyl; and R' is a radical selected from the group consisting of alkyl containing at least 4 carbon atoms, alkenyl, and cycloalkyl.

2. The N-substituted α-etherified acetamides having the general formula:

R"—O—CH₂CO—NHR' wherein R" is halogenated aryl; and R' is a radical selected from the group consisting of alkyl containing at least 4 carbon atoms, alkenyl, and cycloalkyl.

3. N-amyl 2,4,5,6-tetrachlorophenoxyacetamide.

4. N-allyl 2,4,5,6-tetrachlorophenoxyacetamide.

5. N-cyclohexyl cyclohexoxyacetamide.

6. An insect combative composition of matter comprising as essential active ingredient an N-substituted α-etherified acetamide having the general formula:

R—O—CH₂CO—NHR' where R is a cyclic organic radical selected from the group consisting of halogenated aryl, homocyclic-substituted aryl, aryl of the napthalene series and unsubstituted cycloalkyl; and R' is a radical selected from the group consisting of alkyl containing at least 4 carbon atoms, alkenyl, and cycloalkyl and a carrier therefor.

7. An insect combative composition of matter comprising as essential active ingredient an N-substituted α-etherified acetamide having the general formula:

R''—O—CH₂CO—NHR' wherein R'' is halogenated aryl; and R' is a radical selected from the group consisting of alkyl containing at least 4 carbon atoms, alkenyl, and cycloalkyl and a carrier therefor.

8. An insect combative composition of matter comprising as essential active ingredient N-amyl 2,4,5,6-tetrachlorophenoxyacetamide and a carrier therefor.

9. An insect combative composition of matter comprising as essential active ingredient N-allyl 2,4,5,6-tetrachlorophenoxyacetamide and a carrier therefor.

10. An insect combative composition of matter comprising as essential active ingredient N-cyclohexyl cyclohexoxyacetamide and a carrier therefor.

11. An insect combative composition of matter comprising as essential active ingredient an N-substituted α-etherified acetamide having the general formula:

R—O—CH₂CO—NHR' wherein R is a cyclic organic radical selected from the group consisting of halogenated aryl, homocyclic-substituted aryl, aryl of the naphthalene series and unsubstituted cycloalkyl; and R' is a radical selected from the group consisting of alkyl containing at least 4 carbon atoms, alkenyl, and cycloalkyl dissolved in an aliphatic alcohol.

12. An insect combative composition of matter comprising as essential active ingredient an N-substituted α-etherified acetamide having the general formula:

R—O—CH₂CO—NHR' wherein R is a cyclic organic radical selected from the group consisting of halogenated aryl, homocyclic-substituted aryl, aryl of the naphthalene series and unsubstituted cycloalkyl; and R' is a radical selected from the group consisting of alkyl containing at least 4 carbon atoms, alkenyl, and cycloalkyl, dissolved in a kerosene type hydrocarbon.

13. An insect combative composition of matter comprising as essential active ingredient an N-substituted α-etherified acetamide having the general formula:

R—O—CH₂CO—NHR' wherein R is a cyclic organic radical selected from the group consisting of halogenated aryl, homocyclic-substituted aryl, aryl of the naphthalene series and unsubstituted cycloalkyl; and R' is a radical selected from the group consisting of alkyl containing at least 4 carbon atoms, alkenyl, and cycloalkyl, dissolved in aqueous alcohol.

14. The N-substituted α-etherified acetamides having the general formula:

R'''—O—CH₂CO—NHR' wherein R''' is unsubstituted cycloalkyl and R' is a radical selected from the group consisting of alkyl containing at least 4 carbon atoms, alkenyl and cycloalkyl.

15. An insect combative composition of matter comprising as essential active ingredient an N-substituted α-etherified acetamide having the general formula:

R'''—O—CH₂CO—NHR' wherein R''' is unsubstituted cycloalkyl and R' is a radical selected from the group consisting of alkyl containing at least 4 carbon atoms, alkenyl and cycloalkyl and a carrier therefor.

LOWELL B. KILGORE.

REFERENCES CITED

The following references are of record in the file of this patent:

UNITED STATES PATENTS

| Number | Name | Date |
|---|---|---|
| 543,579 | Lederer | July 30, 1895 |
| 2,120,512 | Rosenhauer | June 14, 1938 |

FOREIGN PATENTS

| Number | Country | Date |
|---|---|---|
| 98,236 | Sweden | Mar. 5, 1940 |
| 501,004 | Great Britain | Feb. 10, 1939 |
| 585,740 | Germany | Oct. 7, 1933 |

OTHER REFERENCES

J. Chem. Soc. of London, vol. 99, part 2, (1911), pages 2331-2332, by Frankland et al.

J. Chem. Soc. of London, vol. 121 (1922), part 2, page 1601, by Minton et al.

J. Econ. Ent., Aug. 1940, page 672, by Bushland.